(12) United States Patent
Flynn

(10) Patent No.: US 6,345,335 B1
(45) Date of Patent: Feb. 5, 2002

(54) DATA PROCESSING MEMORY SYSTEM

(75) Inventor: David Walter Flynn, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/394,425

(22) Filed: Sep. 13, 1999

(30) Foreign Application Priority Data

Jan. 15, 1999 (GB) .............................................. 9900958

(51) Int. Cl.$^7$ .............................................. G06F 12/00
(52) U.S. Cl. ........................ 711/123; 711/131; 711/149
(58) Field of Search ................................ 711/123, 131, 711/149

(56) References Cited

U.S. PATENT DOCUMENTS 5,594,884 A  * 1/1997 Matoba et al. .............. 711/131

FOREIGN PATENT DOCUMENTS

| GB | 2 292 822 | 3/1996 |
| GB | 2 311 880 | 10/1997 |

* cited by examiner

Primary Examiner—Jack A. Lane
(74) Attorney, Agent, or Firm—Nixon & Vanderhye P.C.

(57) ABSTRACT

A data processing system 2 is provided with a Harvard-type central processing unit 4 coupled to a first level memory 16. The first level memory 16 may be in the form of a cache memory. The first level memory 16 has a data access port and an instruction access port that support parallel data side and instruction side operations. A cache controller 62 may be provided to arbitrate between situations in which concurrent write operations to the same memory location are requested. A separate line fill port may be provided for cache line fills following a cache miss.

15 Claims, 4 Drawing Sheets

DATA PROCESSING MEMORY SYSTEM

BACKGROUND OF THE INVENTION

1. Field of the Invention

This invention relates to the field of data processing systems. More particularly, this invention relates to a memory system for use with a Harvard architecture central processing unit.

2. Description of the Prior Art

Harvard central processing units include separate data and instruction paths to associated memories allowing data access operations and instruction access operations to be performed in parallel. This can increase processing performance.

In classical Harvard designs completely separate data memory systems and instruction memory systems are provided. An example of such a classical Harvard design would be a DSP system in which the DSP code was provided in a ROM and supplied via the instruction access side to the CPU with all the data being stored within separate RAM storage and supplied via the data access side.

The term Harvard has also come to denote systems having separate data and instruction caches as the first level memory system, but with a single higher order memory system such as RAM or non-volatile storage.

Whilst a Harvard architecture has the advantage of allowing parallel access operations on the data and instruction sides, there are a number of disadvantages. Slow and complex mechanisms may need to be provided if data such as in-line constants is accessed from the instruction side, i.e. "literal" data that is part of the instruction memory image. In cases where the data and instructions share a common higher order address space, then there is the problem of ensuring "coherency" between the data words and instruction words. A further problem is that the instruction side is usually read-only and accordingly additional complexity and circuit elements need to be provided to support some debugging of operations, such as the insertion of break points within the instruction code.

A further disadvantage of existing Harvard systems is that at least the first level memory storage has to be divided between the data and instruction sides in a fixed manner when the hardware is provided. This fixed division will in many cases not make the best use of the total memory storage capacity being provided. For some applications, and at some times during execution, data side storage may be in short supply whilst there is an excess of instruction side storage. The converse situation may arise in other circumstances.

SUMMARY OF THE INVENTION

Viewed from one aspect the invention provides data processing apparatus comprising:

(i) a central processing unit having separately provided a data address bus, a data word bus, an instruction address bus and an instruction word bus;

(ii) a first level memory coupled to said central processing unit such that access to data words is via said data address bus and said data word bus and access to instruction words is via said instruction address bus and said instruction word bus; wherein (iii) said first level memory has a data access port linked to said data address bus and said data word bus and an instruction access port linked to said instruction address bus and said instruction word bus such that a memory location within said first level memory may be access via both said data access port and said instruction access port.

The present invention addresses the above problems by providing a Harvard-type central processing unit having separate data and instruction sides with a common first level memory having both a data access port and an instruction access port. The separate data access port and instruction access port to the first level memory allows the parallel access operations on the data side and the instruction side to continue and so does not detract from the performance advantages associated with such Harvard-type systems. Providing the first level memory as a common structure allows high speed access to "literals" from the instruction side to be made without requiring a relatively slow access to a higher level common memory structure. As the data and instructions are stored within a common first level memory, there is guaranteed coherence between the data and instructions. The provision of the instructions within the same first level memory as the data has the result that the instructions may be relatively easily modified during debug, such as by the insertion of break points.

The common first level memory structure also allows the best use to be made of the total storage capacity provided with it being possible for a programmer to divide up the first level memory between the instructions and the data as a matter of simple configuration and also possibly to enable this to change dynamically.

The use as first level memory of a dual port structure or a structure having more than two ports would normally be considered disadvantageous by those in the field as the extra access ports mean that the same total amount of memory storage will consume a greater surface area on an integrated circuit. For example, a system in accordance with one embodiment of the invention might include 10 kilobytes of dual port memory whereas a prior art system may have been provided with two 5 kilobyte blocks of single port memory for the instruction and data sides respectively. The 10 kilobytes of dual port memory might have an area 30% greater than would be occupied by the two blocks of 5 kilobyte memory. Such a penalty would normally be considered prohibitive within the integrated circuit design field. However, the present invention recognizes that the numerous advantages associated with such an arrangement as discussed above outweigh this disadvantage and accordingly the invention moves against the technical prejudice in the field.

The first level memory may be addressed in various different ways. However, the invention preferably includes a data address decoder and an instruction address decoder whether this be in the form of respective content addressable memories storing cache TAGs, the type of row and column address decoder associated with bulk RAM storage or some other form.

A preferred embodiment that yields many of the advantages discussed above is one in which the data side includes read/write access whilst the instruction side provides only read access. Read/write access is required on the data side to enable useful processing to be performed whilst the restriction to read access on the instruction side simplifies the instruction side implementation and does not introduce a significant penalty. This is particularly the case with the common first level memory of the invention as write access to instruction words can be gained relatively rapidly via the data side if required.

The first level memory is the memory closest to the central processing unit. It is possible that this may be bulk RAM main storage in some relatively low performance applications. However, in preferred embodiments the first level memory is a cache memory with higher order main memory being provided in addition. In this context the invention provides a Harvard-type central processing unit in combination with a dual port cache to yield the significant advantages discussed above.

The principle of the invention may be developed further in preferred embodiments by the provision of a line fill access port for the cache memory. In such embodiments, if a cache miss occurs, then the resultant line fill operation can be performed via the line fill access port with the possibility for other processing to continue using the other access ports. The advantages of this preferred embodiment depend upon how critical was the cache miss that occurred in halting the processing flow.

In such embodiments having a line fill access port and a data access port providing write access, preferred embodiments recognize the possibility for a conflict arising through simultaneous operations seeking to write to the same memory location via the two different access ports. The cache controller may be arranged to detect such simultaneous conflicting write requests and arbitrate between them, e.g. to allow the line fill to complete before the data write.

It will also be recognized that the dual port access provides the potential for conflicts when simultaneous writes and reads occur to the same memory location in the same processing cycle. This may be addressed such that at least predictable results are achieved by arranging that a read operation captures its data within a first portion of a processing cycle that is before a second portion of the processing cycle in which any write operation will modify the data within a memory storage location.

The dual port first level memory is preferably provided by arranging each memory cell to be associated with separate access enable signal lines associated with each access port and separate bit lines associated with the word buses for each port.

Viewed from another aspect the present invention provides a data processing method comprising the steps of:
  (i) separately coupling a central processing unit to a first level memory via a data address bus, a data word bus, an instruction address bus and an instruction word bus, such that access to data words is via said data address bus and said data word bus and access to instruction words is via said instruction address bus and said instruction word bus; wherein
  (ii) said first level memory has a data access port linked to said data address bus and said data word bus and an instruction access port linked to said instruction address bus and said instruction word bus such that a memory location within said first level memory may be access via both said data access port and said instruction access port.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
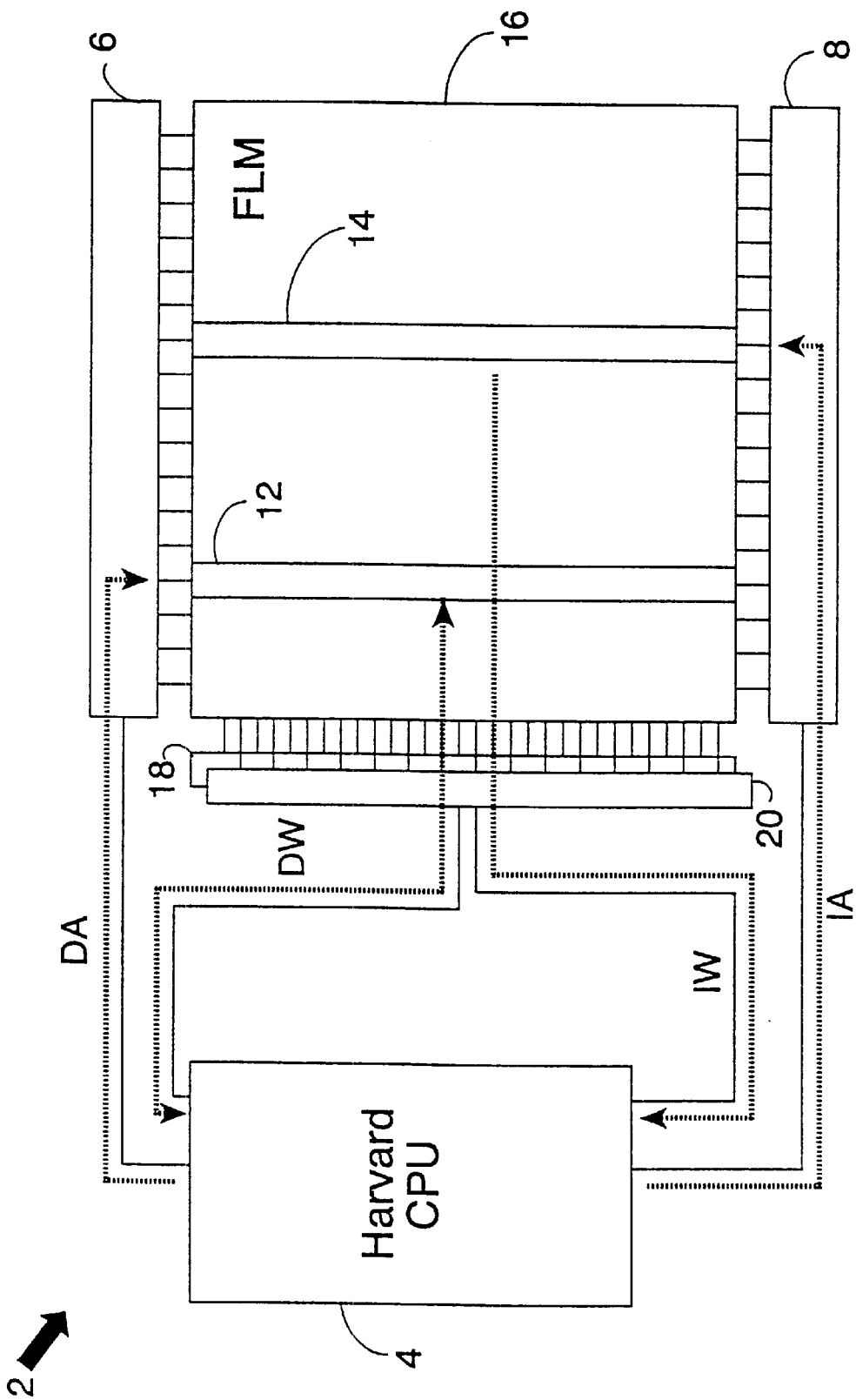
FIG. 1 illustrates a Harvard-type CPU coupled to a dual port first level memory.

FIG. 1 illustrates a data processing system 2 comprising a Harvard-type central processing unit 4. The Harvard-type central processing unit 4 may, for example, be an ARM9 CPU core such as is produced by ARM Limited of Cambridge, England. The Harvard-type central processing unit 4 has a data address bus DA, a data word bus DW, an instruction address bus IA and an instruction word bus IW.

The data address bus DA passes a data address signal to a data address decoder 6. Similarly, the instruction address but IA passes an instruction address to an instruction address decoder 8. The data address decoder 6 and the instruction address decoder 8 could be conventional row and column type decoders or content addressable memories as well as other possible types. The data address decoder 6 and the instruction address decoder 8 respectively operate to decode the address input to them and select a row of memory cells 12, 14 within the first level memory 16 that are to be respectively accessed by the data and instruction sides.

The data side provides both read and write access to the row of memory cells 12. The instruction side provides read-only access to the row of memory cells 14. On the data side the circuit block 18 provides sense amplifiers for reading the bit lines to recover data words and bit line drivers for writing data words on to the bit lines to write data to the row of memory cells 12 as required (all cache line fill may be done via this route). On the instruction side, the circuit block 20 need only provide sense amplifiers for the reading of the signals on the bit lines through the first level memory.

It will be appreciated that separate sets of bit lines are provided for the data side and the instruction side running through the first level memory 16. This will be discussed later in connection with FIG. 2.

In operation the Harvard-type central processing unit 4 operates to issue parallel access requests on the data side and the instruction side that are decoded by their respective address decoders 6, 8 to select an appropriate row of memory cells 12, 14. The separate data word bus DW and instruction word bus IW can then provide access to the respective row of memory cells 12, 14.

A given row of memory cells may store instruction codes. However, if it is desired to modify these instruction codes, for example to insert a break point in place of one or more instruction words, then the relevant row of memory cells 14 can be accessed via the data side to provide rapid modification of the stored instruction words. In a similar way, if the data side requires access to "literal" data, then direct access to the memory row may also be made.

When the data side and the instruction side share a common memory address space, there will be guaranteed coherency between the data and the instruction side since a single memory address will correspond to the same physical set of memory cells within the first level memory so prohibiting the possibility of the instruction and data sides storing different values. The storage capacity of the first level memory 16 can be divided in any way desired by the software programmer between instructions words and data words. This may alter dynamically during operation. It is important that data processing operations should not inadvertently alter instruction codes, but this may be dealt with by careful debugging of the software or memory access protection hardware.

Figure 2:
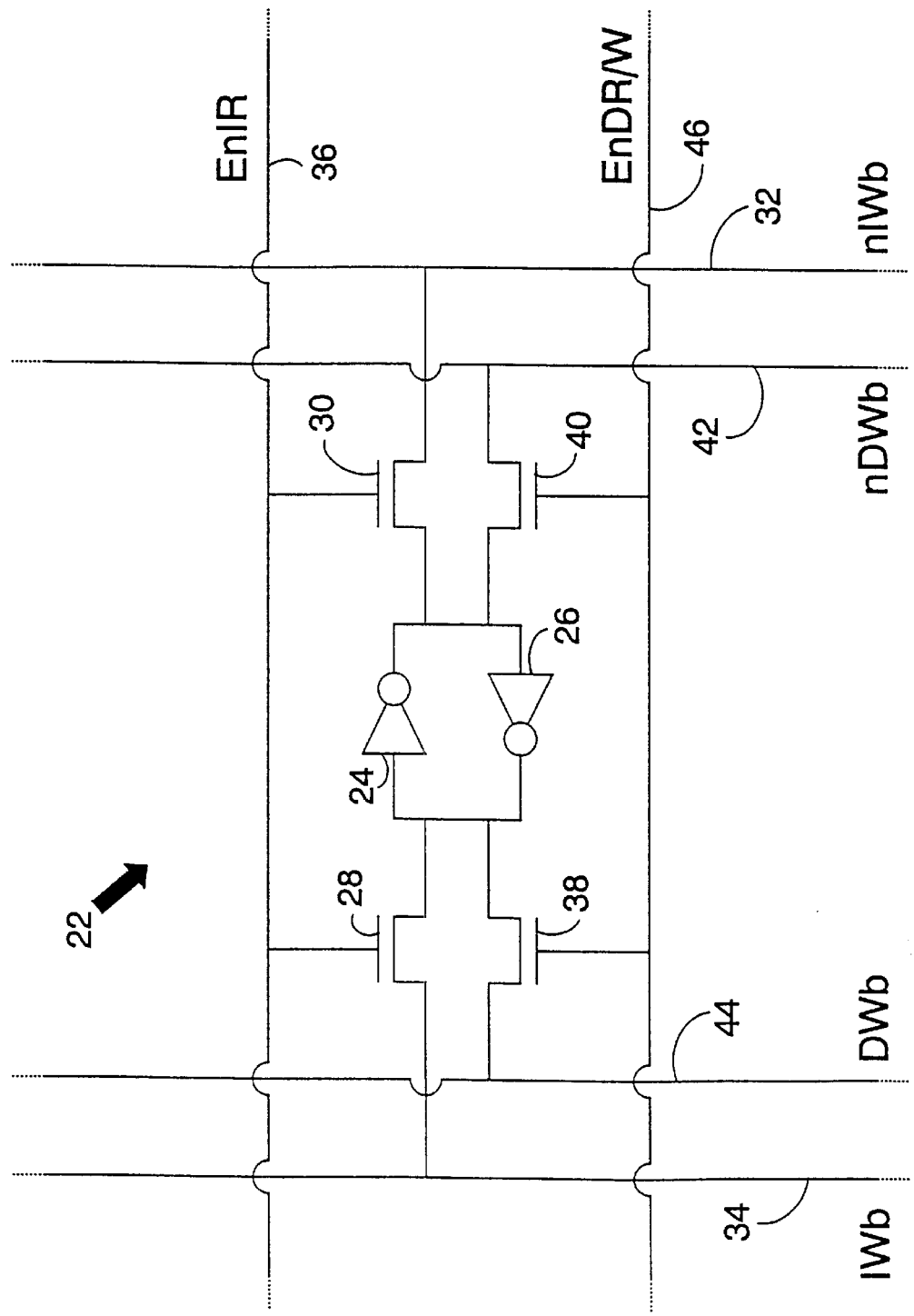
FIG. 2 illustrates a memory cell within a dual port memory.

FIG. 2 illustrates a memory cell 22 comprising opposed inverters 24, 26 storing one bit of data. Instruction word access gates 28, 30 control coupling of the stored bit to the instruction bit lines 32, 34 in response to an enable instruction read signal on an enable instruction read line 36. In a similar way, data word access gates 38, 40 control coupling of the stored bit to the data bit lines 42, 44 under control of an enable data access signal on an enable data access signal line 46. The memory cell has more components and it of a greater area than that of a single port memory.

Figure 3:
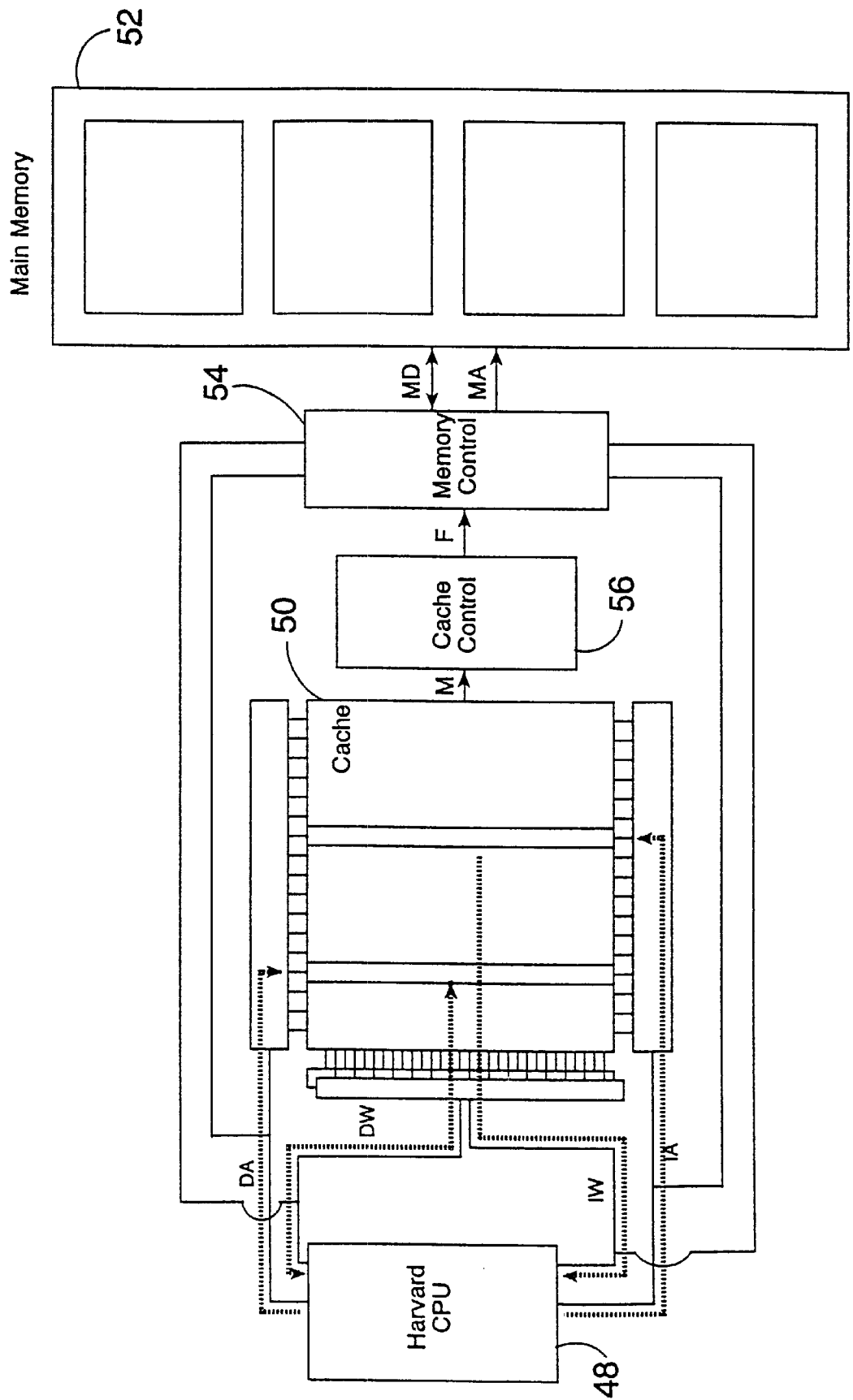
FIG. 3 illustrates a system having a Harvard-type CPU coupled to a cache memory as the first level memory and having an associated main memory as a higher order memory.

FIG. 3 shows a Harvard-type central processing unit 48 coupled to a first level memory in the form of a cache memory 50. A second level memory in the form of a main memory 52 comprising a plurality of DRAM banks is coupled to the rest of the system via a memory controller 54.

The cache memory 50 is a dual port memory providing parallel access to the data and instruction sides of the Harvard-type central processing unit 48. If a cache miss occurs, then a signal M indicates this to a cache controller 56. The cache controller 56 in turn initiates a line fill operation using a line fill signal F to the memory controller 54. A single main memory data bus MD and main memory address bus MA is provided between the memory controller 54 and the main memory 52. The memory controller 54 is also coupled to the data address bus DA and the instruction address bus IA. Accordingly, when a miss occurs and a line fill operation is requested, the memory controller 54 can request the addressed data words or instruction words from the main memory 52. When these line fill data words are returned from the main memory 52, they can be streamed in parallel to the Harvard-type central processing unit 48 and the cache memory 50 via the instruction word bus IW or the data word bus DW. Cache line fill operations to resulting from instruction misses may be written via the data word bus to the cache memory 50.

Figure 4:
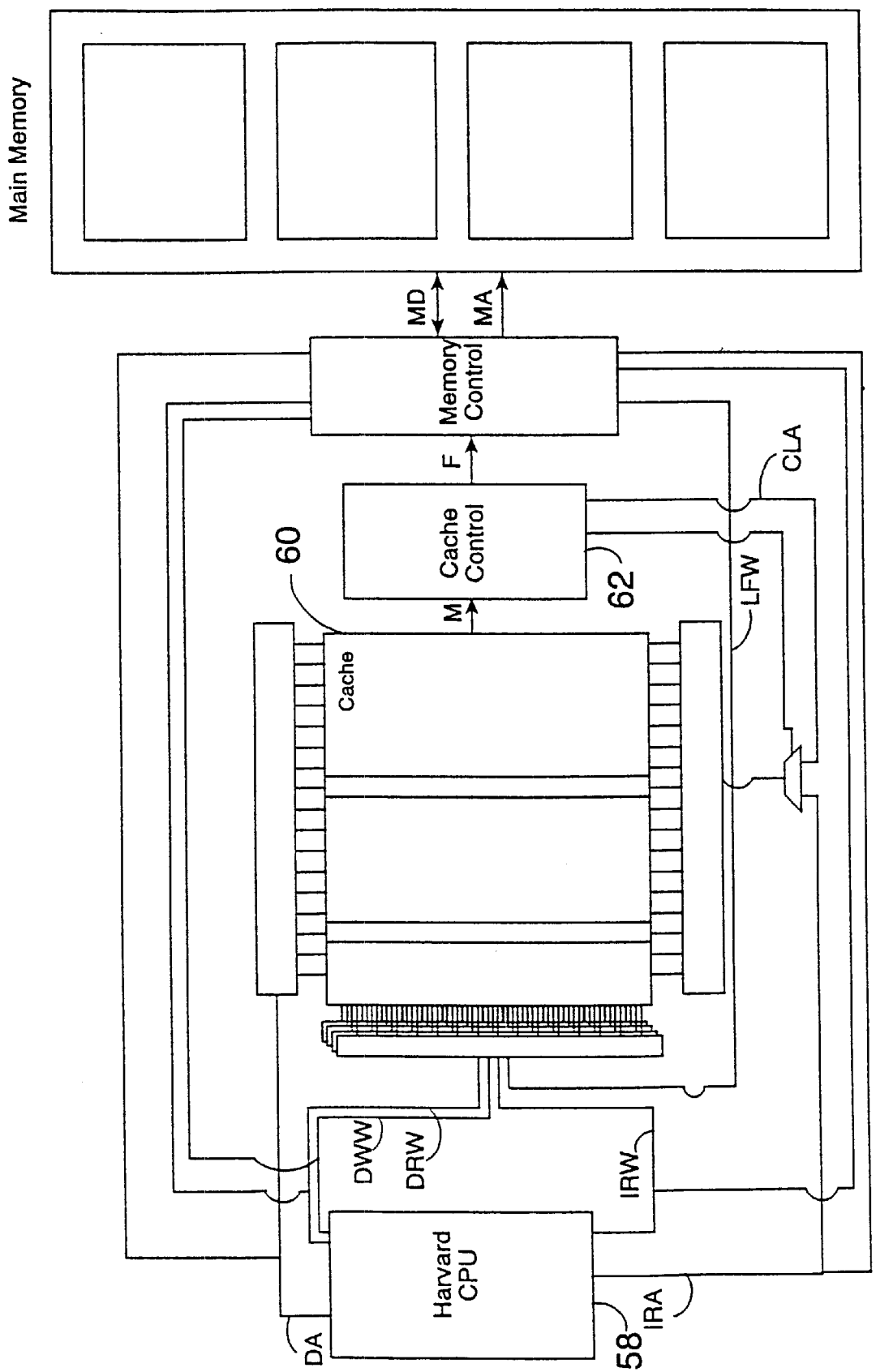
FIG. 4 illustrates the embodiment of FIG. 1 modified to have a four port cache memory providing a data read port, a data write port, an instruction read port and a line fill write port.

FIG. 4 illustrates another embodiment in which a Harvard-type central processing unit 58 is provided with a four port cache memory 60. The four access ports to the cache memory 60 respectively provide data read access, data write access, instruction read access and line fill access. Word W buses are provided for each of the ports, a data address bus DA is provided for the data side and a multiplexed address bus is provided on the instruction side.

As two write ports are provided, namely the data word write port and the line fill write port, the cache controller 62 arbitrates between these two potential sources of writes to the cache memory 60. Two writes to the same memory location must be sequenced such that precedence is typically given to a data write over a line fill write. If the cache controller 62 detects that a cache line fill is needed then it multiplexes a cache line address CLA to the cache memory rather than the instruction read address IRA.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Data processing apparatus comprising:
   (i) a central processing unit having separately provided a data address bus, a data word bus, an instruction address bus and an instruction word bus;
   (ii) a first level memory coupled to said central processing unit such that access to data words is via said data address bus and said data word bus and access to instruction words is via said instruction address bus and said instruction word bus; wherein
   (iii) said first level memory has a data access port linked to said data address bus and said data word bus and an instruction access port linked to said instruction address bus and said instruction word bus such that a memory location within said first level memory may be accessed via both said data access port and said instruction access port.

2. Data processing apparatus as claimed in claim 1, wherein said first level memory includes a data address decoder responsive to a data address upon said data address bus for selecting a memory location within said first level memory to be accessed.

3. Data processing apparatus as claimed in claim 1, wherein said first level memory includes an instruction address decoder responsive to an instruction address upon said instruction address bus for selecting a memory location within said first level memory to be accessed.

4. Data processing apparatus as claimed in claim 1, wherein said data word bus is a data word read/write bus.

5. Data processing apparatus as claimed in claim 1, wherein said instruction word bus is an instruction word read bus.

6. Data processing apparatus as claimed in claim 1, wherein said first level memory is a cache memory.

7. Data processing apparatus as claimed in claim 6, further comprising a main memory coupled to said cache memory for storing data words and instruction words that may be cached within said cache memory.

8. Data processing apparatus as claimed in claim 7, wherein said cache memory includes a line fill access port coupled to said main memory such that when a cache miss occurs in said cache memory resulting in a cache line fill operation from said main memory being triggered, then said cache line fill operation is performed using said line fill access port.

9. Data processing apparatus as claimed in claim 8, wherein a cache controller operates to arbitrate between write operations to a common memory location in a common processing cycle via said data access port and said line fill access port.

10. Data processing apparatus as claimed in claim 6, wherein said cache memory is a dual port cache memory.

11. Data processing apparatus as claimed in claim 1, wherein a read operation to a memory location in said first level memory to obtain a read word captures said read word in a first portion of a processing cycle and a write operation to said memory location to write a write word overwrites said memory location in a second portion of said processing cycle following said first portion.

12. Data processing apparatus as claimed in claim 1, wherein each memory location within said first level memory is coupled to a data word access enable line and an instruction word access enable line such that, if said data address matches said memory storage location, then a match signal on said data word access enable line triggers connection of said memory storage location to said data word bus, and if said instruction address matches said memory storage location, then a match signal on said instruction word access enable line triggers connection of said memory storage location to said instruction word bus.

13. Data processing apparatus as claimed in claim 1, wherein said first level memory comprises a data read access port coupled to a data address read bus and a data word read bus and a data write access port coupled to a data address write bus and a data word write bus.

14. Data processing apparatus as claimed in claim 1, wherein said data processing apparatus is formed as an integrated circuit.

15. A data processing method comprising the steps of:
(i) separately coupling a central processing unit to a first level memory via a data address bus, a data word bus, an instruction address bus and an instruction word bus, such that access to data words is via said data address bus and said data word bus and access to instruction words is via said instruction address bus and said instruction word bus; wherein (ii) said first level memory has a data access port linked to said data address bus and said data word bus and an instruction access port linked to said instruction address bus and said instruction word bus such that a memory location within said first level memory may be accessed via both said data access port and said instruction access port.

* * * * *